(12) United States Patent
Hara (10) Patent No.: US 9,233,714 B2
(45) Date of Patent: Jan. 12, 2016

(54) VEHICLE BODY FRONT PORTION STRUCTURE

(71) Applicant: TOYOTA JIDOSHA KABUSHIKI KAISHA, Toyota (JP)

(72) Inventor: Yasuhiro Hara, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/427,425

(22) PCT Filed: Sep. 13, 2013

(86) PCT No.: PCT/JP2013/074934
§ 371 (c)(1),
(2) Date: Mar. 11, 2015

(87) PCT Pub. No.: WO2014/042257
PCT Pub. Date: Mar. 20, 2014

(65) Prior Publication Data
US 2015/0239503 A1    Aug. 27, 2015

(30) Foreign Application Priority Data
Sep. 14, 2012   (JP) ................................. 2012-203131

(51) Int. Cl.
*B62D 21/15*   (2006.01)
*B62D 25/08*   (2006.01)
(Continued)

(52) U.S. Cl.
CPC .............. *B62D 21/152* (2013.01); *B62D 21/09* (2013.01); *B62D 25/08* (2013.01); *B62D 25/20* (2013.01); *B62D 25/2018* (2013.01); *B62D 27/026* (2013.01)

(58) Field of Classification Search
CPC .......................... B62D 21/152; B62D 25/082
USPC ............................ 296/187.1, 187.09; 280/784
See application file for complete search history.

(56) References Cited

U.S. PATENT DOCUMENTS 8,544,589 B1 * 10/2013 Rupp .................... B62D 21/152
180/274
8,608,231 B1 * 12/2013 Mendivil ................ B60R 19/34
293/133

(Continued)

FOREIGN PATENT DOCUMENTS

JP      06-344952      12/1994
JP     2005-067347      3/2005

(Continued)

OTHER PUBLICATIONS

International Search Report Issued Nov. 5, 2013 in PCT/JP13/074934 filed Sep. 13, 2013.

*Primary Examiner* — Jason S Morrow
(74) *Attorney, Agent, or Firm* — Oblon, McClelland, Maier & Neustadt, L.L.P.

(57) ABSTRACT

A suspension member is coupled to a front side attachment portion and a rear side attachment portion of a front side member. A stabilizer bracket is secured to the section of the front side member between a front end portion of the front side member and the front side attachment portion. A reinforcement member that projects outward in the vehicle width direction relative to the front end portion is bonded to a vehicle width direction outside side wall portion of the front end portion. The reinforcement member makes the vehicle front and rear direction yield strength of the front side member higher at the front end portion than at the section between the front side attachment portion and the rear side attachment portion.

3 Claims, 6 Drawing Sheets (51) Int. Cl.
    *B62D 21/09*      (2006.01)
    *B62D 25/20*      (2006.01)
    *B62D 27/02*      (2006.01)

(56) References Cited

U.S. PATENT DOCUMENTS

| | | | |
|---|---|---|---|
| 9,027,695 B2 * | 5/2015 | Nakamura | B62D 21/155 180/247 |
| 9,120,507 B1 * | 9/2015 | Alwan | B62D 21/152 |
| 2011/0309655 A1 | 12/2011 | Mori | |
| 2012/0248820 A1 * | 10/2012 | Yasui | B60R 19/34 296/187.09 |
| 2014/0117717 A1 * | 5/2014 | Parkila | B60R 19/24 296/187.09 |
| 2014/0159420 A1 * | 6/2014 | Hashimoto | B62D 21/152 296/187.1 |
| 2014/0167450 A1 * | 6/2014 | Sotoyama | B62D 21/152 296/187.09 |
| 2014/0361560 A1 * | 12/2014 | Sakakibara | B62D 21/152 293/133 |
| 2015/0014084 A1 * | 1/2015 | Iwama | B62D 25/082 180/312 |
| 2015/0035316 A1 * | 2/2015 | Kuriyama | B62D 21/152 296/187.1 |
| 2015/0076862 A1 * | 3/2015 | Abe | B62D 21/152 296/187.1 |
| 2015/0115653 A1 * | 4/2015 | Ookubo | B62D 21/152 296/187.1 |
| 2015/0145282 A1 * | 5/2015 | Basappa | B62D 21/152 296/187.1 |
| 2015/0246651 A1 * | 9/2015 | Muraji | B62D 21/152 296/187.1 |

FOREIGN PATENT DOCUMENTS

| | | |
|---|---|---|
| JP | 2006-137373 A | 6/2006 |
| JP | 2006-240322 | 9/2006 |
| JP | 2007-062568 | 3/2007 |
| JP | 2009-040299 | 2/2009 |
| JP | 2009-255883 | 11/2009 |
| JP | 2010-221991 | 10/2010 |
| JP | 2011-230602 | 11/2011 |
| JP | 2013-111997 A | 6/2013 |
| JP | 2014-15088 A | 1/2014 |
| WO | WO 2014/007403 A1 | 1/2014 |

* cited by examiner

VEHICLE BODY FRONT PORTION STRUCTURE

TECHNICAL FIELD

The present invention relates to a vehicle body front portion structure.

BACKGROUND ART

In patent document 1, there is disclosed a vehicle body front portion structure equipped with a front side frame, which extends in the vehicle front and rear direction, and a sub frame, which is coupled to the front side frame at a front side coupling portion and a rear side coupling portion spaced apart from one another in the vehicle front and rear direction.

In the vehicle body front portion structure disclosed in patent document 1, the front side frame comprises a front side deformation portion on the vehicle front side of the sub frame, a central side deformation portion between the front side coupling portion and the rear side coupling portion coupled to the sub frame, and a rear side deformation portion on the vehicle rear side of the rear side coupling portion. The vehicle front and rear direction yield strength of the front side frame is set in such a way as to become higher in the order of the front side deformation portion, the central side deformation portion, and the rear side deformation portion.

According to this vehicle body front portion structure, the amount of deformation of the front side frame in a case where the vehicle has become involved in a frontal crash or an offset crash becomes smaller heading toward the vehicle rear side, so the effect exerted on the cabin by the frontal crash or the offset crash can be reduced.

CITATION LIST

Patent Documents

Patent Document 1: JP-A No. 2009-255883
Patent Document 2: JP-A No. 2006-240322
Patent Document 3: JP-A No. 2005-67347

SUMMARY OF INVENTION

Technical Problem

However, in the vehicle body front portion structure described above, the amount of deformation of the front side frame toward the vehicle rear side during a frontal crash or an offset crash is small, so it is difficult to make the deformation stroke of the front end of the front side frame toward the vehicle rear side larger.

Furthermore, in this type of vehicle body front portion structure, it is desirable to ensure a deformation stroke toward the vehicle rear side for the front end of the front side frame even during a small overlap crash where two vehicles pass one another.

The present invention has been made in view of the problem described above, and it is an object thereof to provide a vehicle body front portion structure that can ensure a deformation stroke toward the vehicle rear side for the front end of the front side member during a frontal crash, an offset crash, and a small overlap crash.

Solution to Problem

In order to solve the problem described above, a vehicle body front portion structure pertaining to a first aspect of the present invention comprises: a front side member that extends in a vehicle front and rear direction; a suspension member that is coupled to a front side attachment portion and a rear side attachment portion that are formed in a section of the front side member on a vehicle rear side of a front end portion of the front side member and are spaced apart from one another in the vehicle front and rear direction; a stabilizer bracket that is secured to a section of the front side member between the front end portion and the front side attachment portion; and a reinforcement member that is bonded to a vehicle width direction outside side wall portion of the front end portion, projects outward in a vehicle width direction relative to the front end portion, and makes a vehicle front and rear direction yield strength of the front side member higher at the front end portion than at a section between the front side attachment portion and the rear side attachment portion.

In this vehicle body front portion structure, the reinforcement member is bonded to the vehicle width direction outside side wall portion of the front end portion (the section on the front end side) of the front side member. The reinforcement member projects outward in the vehicle width direction relative to the front end portion of the front side member. Consequently, during a small overlap crash, an overlap with the barrier (impactor) is ensured, so the crash load can be transmitted via the reinforcement member to the front side member.

Furthermore, because the reinforcement member is bonded to the front end portion of the front side member as described above, the reinforcement member makes the vehicle front and rear direction yield strength of the front side member higher at the front end portion than at the section between the front side attachment portion and the rear side attachment portion. Consequently, during a small overlap crash, the section of the front side member between the front side attachment portion and the rear side attachment portion becomes deformed, so the suspension member can be allowed to drop out from the front side attachment portion. Because of this, the suspension member can be kept from becoming crushed and left, so an amount of deformation toward the vehicle rear side for the section of the front side member between the front side attachment portion and the rear side attachment portion is ensured.

Moreover, the stabilizer bracket is secured to the section of the front side member between the front end portion and the front side attachment portion. Consequently, the stabilizer bracket is shifted toward the vehicle rear side relative to the reinforcement member bonded to the front end portion of the front side member, so during a small overlap crash the front side member becomes bent inward in the vehicle width direction between the reinforcement member and the stabilizer bracket. Because of this, an amount of deformation toward the vehicle rear side for the section of the front side member where the reinforcement member and the stabilizer bracket are disposed is ensured.

In this way, according to this vehicle body front portion structure, during a small overlap crash, an amount of deformation toward the vehicle rear side for the front side member is ensured, so a deformation stroke toward the vehicle rear side for the front end of the front side member can be ensured.

Furthermore, during a frontal crash or an offset crash also, like during the small overlap crash described above, the section of the front side member between the front side attachment portion and the rear side attachment portion and the section of the front side member where the reinforcement member and the stabilizer bracket are disposed become deformed, so that an amount of deformation toward the vehicle rear side for the front side member is ensured. Consequently, during a frontal crash or an offset crash also, a deformation stroke toward the vehicle rear side for the front end of the front side member can be ensured.

A vehicle body front portion structure pertaining to a second aspect of the present invention is given a configuration where, in the vehicle body front portion structure pertaining to the first aspect of the present invention, the reinforcement member comprises: a front wall portion that extends in the vehicle front and rear direction and the vehicle up and down direction; and a slanted wall portion that slants relative to the vehicle front and rear direction in such a way as to head inward in the vehicle width direction heading toward the vehicle rear side and is formed between a vehicle width direction outside end portion of the front wall portion and the vehicle width direction outside side wall portion of the front end portion.

According to this vehicle body front portion structure, the reinforcement member comprises the front wall portion that extends in the vehicle front and rear direction and the vehicle up and down direction. Consequently, during a small overlap crash, the crash load is efficiently input from the barrier to the front wall portion of the reinforcement member, so the efficiency with which the load is transmitted from the barrier to the front side member can be improved.

Furthermore, the slanted wall portion that slants relative to the vehicle front and rear direction in such a way as to head inward in the vehicle width direction heading toward the vehicle rear side is formed between the vehicle width direction outside end portion of the front wall portion and the vehicle width direction outside side wall portion of the front end portion of the front side member. Consequently, because of the crash load transmitted through the slanted wall portion, a component force inward in the vehicle width direction acts on the front side member between the reinforcement member and the stabilizer bracket, so the front side member can be efficiently bent inward in the vehicle width direction.

A vehicle body front portion structure pertaining to a third aspect of the present invention is given a configuration where, in the vehicle body front portion structure pertaining to the first aspect or the second aspect of the present invention, the front side member is disposed on a vehicle width direction outer side of a power unit installed in the vehicle body front portion.

According to this vehicle body front portion structure, the front side member is disposed on the vehicle width direction outer side of the power unit installed in the vehicle body front portion. Consequently, as described above, during a small overlap crash, in a case where the front side member has become bent inward in the vehicle width direction between the reinforcement member and the stabilizer bracket, the bent portion of the front side member interferes with the power unit. Because of this, a reaction force acts on the bent portion from the power unit, so a lateral force can be produced with respect to the vehicle body during a small overlap crash.

Advantageous Effects of Invention

As described in detail above, according to the present invention, a deformation stroke toward the vehicle rear side for the front end of the front side member during a frontal crash, an offset crash, and a small overlap crash can be ensured.

DESCRIPTION OF EMBODIMENT

An embodiment of the present invention will be described below with reference to the drawings.

In the drawings described below, arrow FR, arrow OUT, and arrow UP indicate frontward in a vehicle front and rear direction, outward (a vehicle left side) in a vehicle width direction, and upward in a vehicle up and down direction, respectively.

Figure 1:
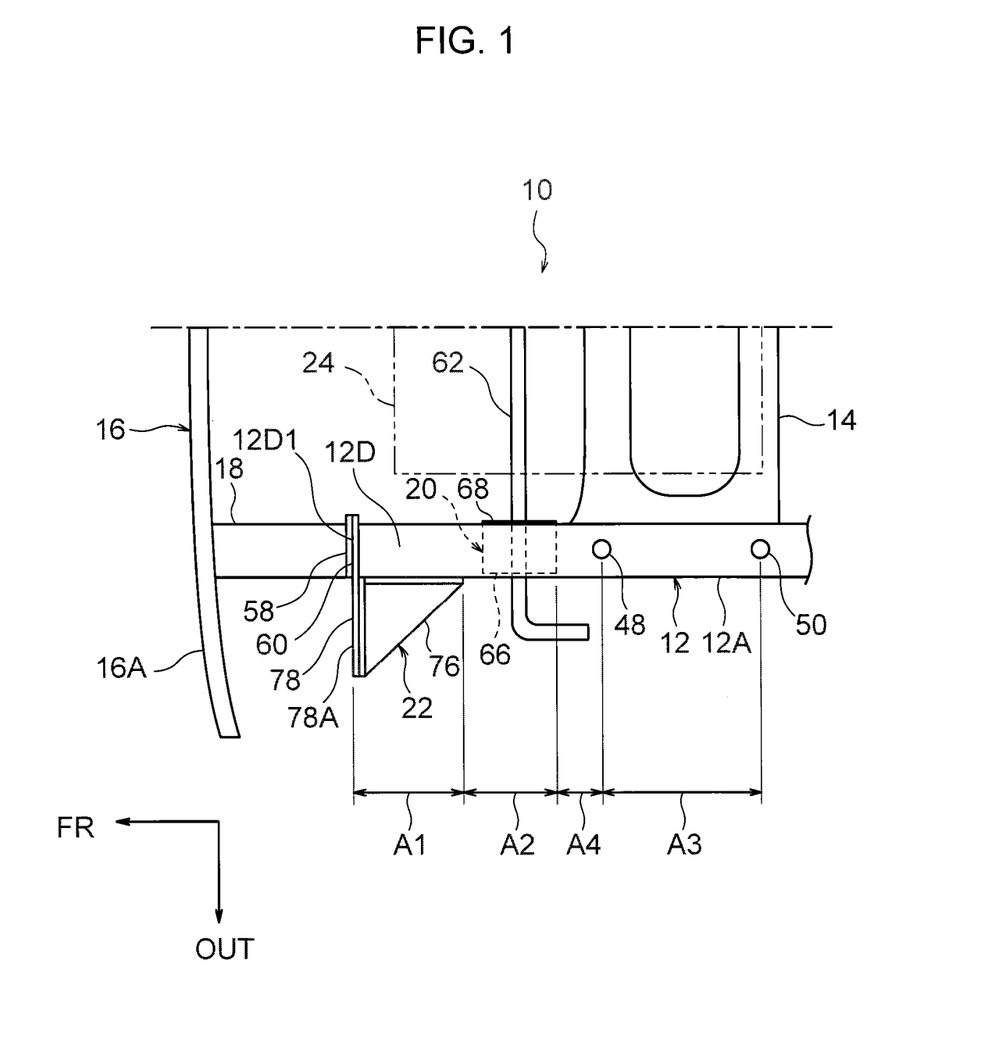
FIG. 1 is plan view of a vehicle body front portion structure pertaining to an embodiment of the present invention.

As shown in FIG. 1, a vehicle body front portion structure 10 pertaining to the embodiment of the present invention is equipped with a front side member 12, a suspension member 14, a bumper reinforcement 16, a crash box 18, a stabilizer bracket 20, and a reinforcement member 22. In FIG. 1, only the left side half of the vehicle body front portion structure 10 is shown, but the vehicle body front portion structure 10 is configured to be bilaterally symmetrical.

The front side member 12 is formed of steel or a light alloy such as aluminum alloy. The front side member 12 is disposed on the vehicle width direction outer side of a power unit 24 installed in the vehicle body front portion and extends in the vehicle front and rear direction. The power unit 24 is configured by an engine or a motor for travel or is given a configuration in which an engine and a motor for travel are combined.

Figure 2:
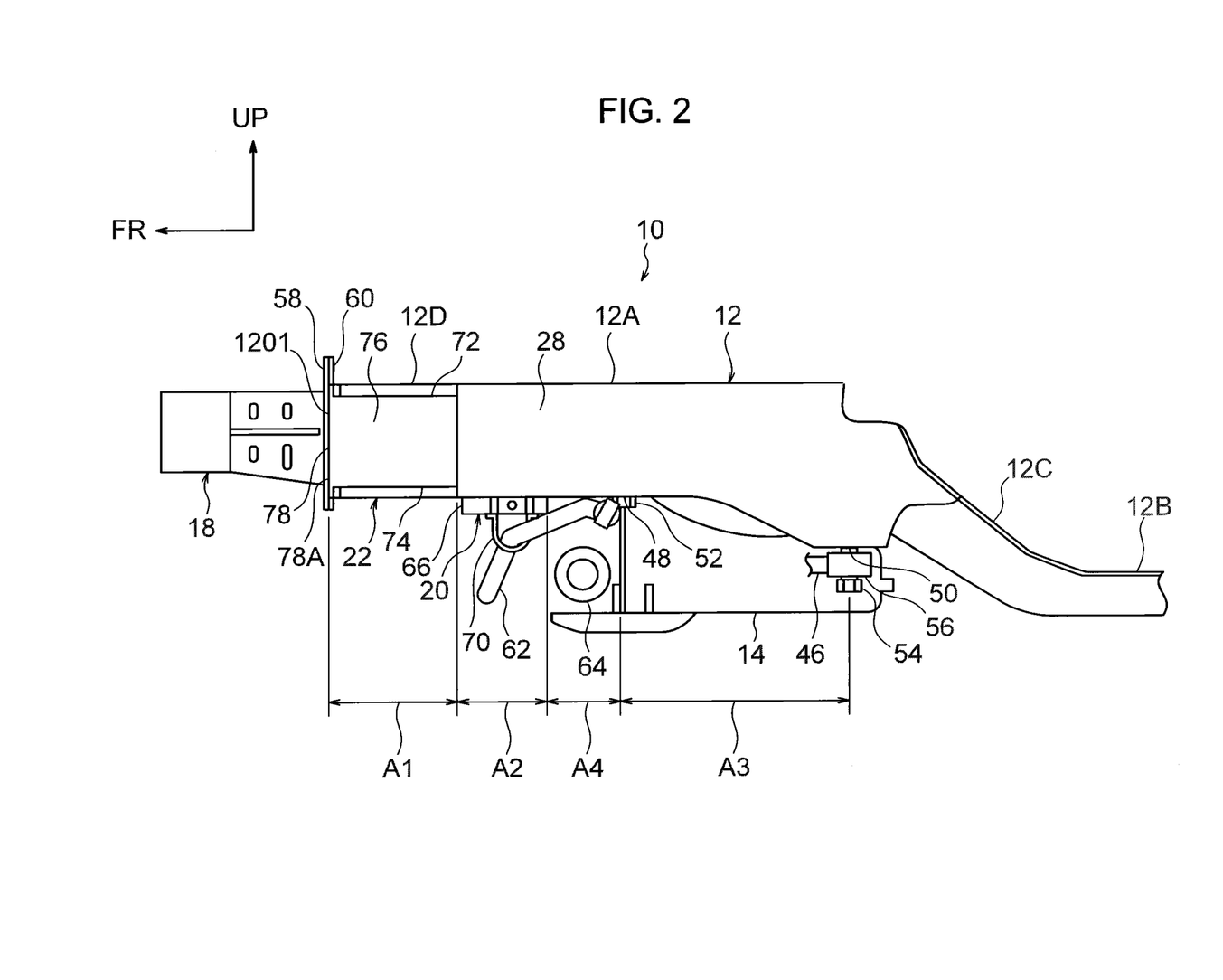
FIG. 2 is a side view of the vehicle body front portion structure shown in FIG. 1.

As shown in FIG. 2, a front portion 12A and a rear portion 12B of the front side member 12 extend horizontally. The section between the front portion 12A and the rear portion 12B is a kick portion 12C, and the kick portion 12C slants in such a way as to head toward the vehicle lower side heading toward the vehicle rear side. The kick portion 12C and the rear portion 12B are formed in a cross-sectional hat shape opening toward the vehicle upper side, are bonded from the vehicle lower side to a non-illustrated floor panel, and form a closed cross section 44 together with the floor panel.

Figure 3:
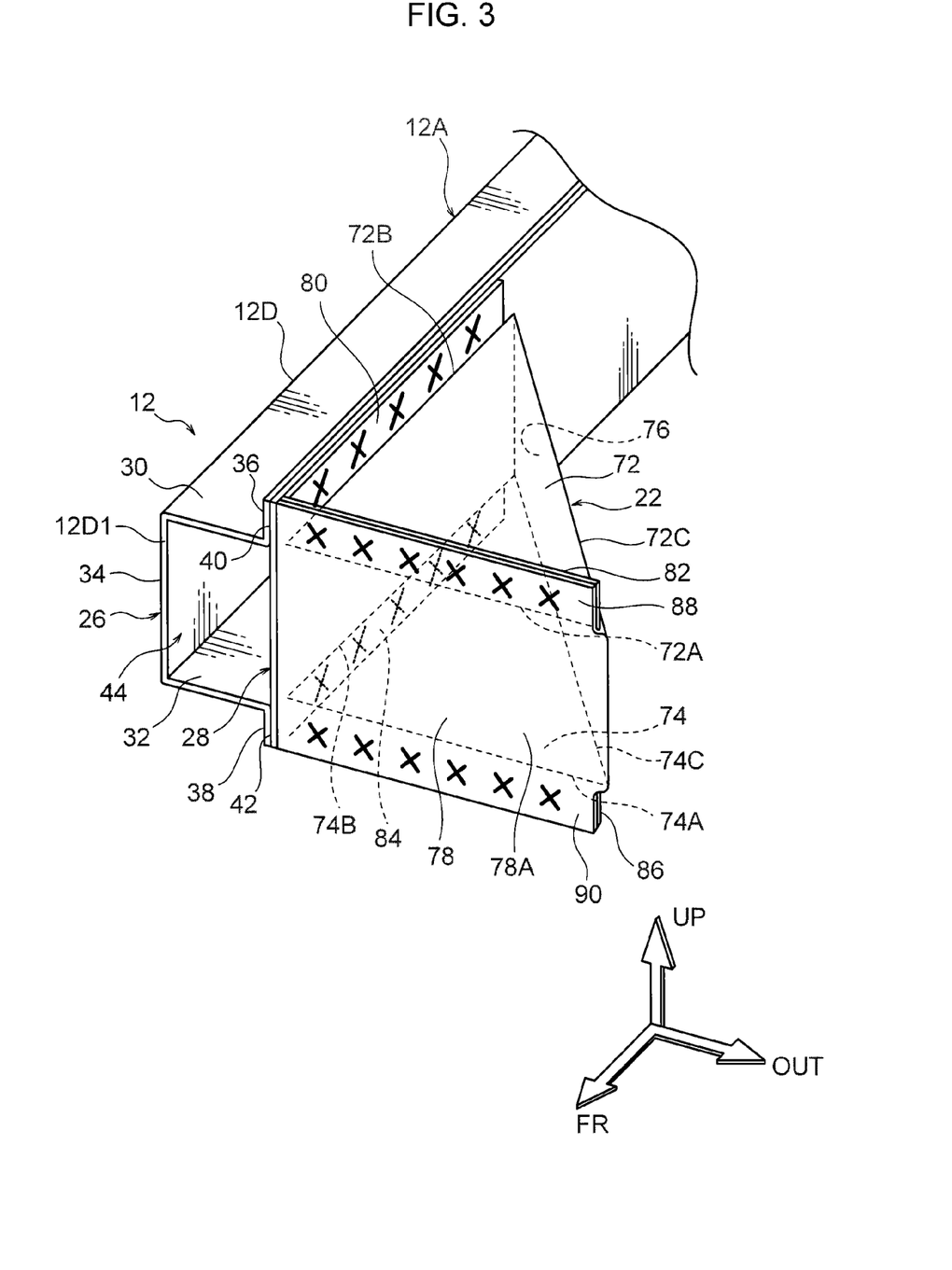
FIG. 3 is a perspective view of a front end portion of a front side member and a reinforcement member shown in FIG. 1.

As shown in FIG. 3, the front portion 12A of the front side member 12 is configured by a side member inner panel 26 and a side member outer panel 28. The side member inner panel 26 is formed in a cross-sectional hat shape opening outward in the vehicle width direction. The side member inner panel 26 comprises an upper wall portion 30 and a lower wall portion 32 that oppose one another in the vehicle up and down direction, a side wall portion 34 that couples the vehicle width direction inside end portions of the upper wall portion 30 and the lower wall portion 32 to one another, and an upper side flange 36 and a lower side flange 38 that extend toward the vehicle upper side and lower side from the vehicle width direction outside end portions of the upper wall portion 30 and the lower wall portion 32, respectively.

The side member outer panel 28 is formed in a flat plate shape and is disposed with its plate thickness direction coinciding with the vehicle width direction. An upper end portion 40 of the side member outer panel 28 is bonded by welding to the upper side flange 36 in a state in which they have been overlaid on one another, and a lower end portion 42 of the side member outer panel 28 is bonded by welding to the lower side flange 38 in a state in which they have been overlaid on one another. Additionally, the side member outer panel 28 forms the closed cross section 44 together with the side member inner panel 26.

The suspension member 14 supports a suspension arm 46 shown in FIG. 2. A front side attachment portion 48 and a rear side attachment portion 50 spaced apart from one another in the vehicle front and rear direction are formed in the section of the front side member 12 on the vehicle rear side of a front end portion 12D, and the suspension member 14 is coupled via bolts 52 and 54 and non-illustrated nuts and rubber bushes to the front side attachment portion 48 and the rear side attachment portion 50. Furthermore, a sleeve 56 is formed on the rear end portion of the suspension arm 46, and the sleeve 56 is fastened to both the suspension member 14 and the rear side attachment portion 50.

The bumper reinforcement 16 is disposed on the vehicle front side of the front side member 12 and extends in the vehicle width direction. A vehicle width direction outside end section 16A of the bumper reinforcement 16 projects further outward in the vehicle width direction than the front side member 12.

The crash box 18 is disposed between the bumper reinforcement 16 and the front side member 12. The front end of the crash box 18 is bonded from the vehicle rear side to the bumper reinforcement 16. A rear side flange 58 whose plate thickness direction coincides with the vehicle front and rear direction is formed on the rear end of the crash box 18. The rear side flange 58 is bonded to a front side flange 60, which is formed with its plate thickness direction coinciding with the vehicle front and rear direction on a front end 12D1 of the front side member 12, in a state in which they have been overlaid on one another. Additionally, in this way the bumper reinforcement 16 is secured via the crash box 18 to the front end 12D1 of the front side member 12.

The stabilizer bracket 20 is secured to the section of the front side member 12 between the front end portion 12D and the front side attachment portion 48 and supports a stabilizer 62 that extends in the vehicle width direction. The stabilizer 62 is disposed on the vehicle lower side of the front side member 12 and is positioned on the vehicle front side and upper side of a drive shaft 64 of front wheels.

Furthermore, the stabilizer bracket 20 comprises a lower wall portion 66 and a side wall portion 68 that extends toward the vehicle upper side from the vehicle width direction inside end portion of the lower wall portion 66, so that the stabilizer bracket 20 is formed in a substantially L-shape as seen in a vehicle front view. The lower wall portion 66 is bonded by welding to, in a state in which it has been overlaid from the vehicle lower side on, the lower wall portion 32 of the front side member 12, and the side wall portion 68 is bonded by welding to, in a state in which it has been overlaid from the vehicle width direction inside on, the side wall portion 34 of the front side member 12. A metal fastener 70 that rotatably supports the stabilizer 62 is attached to the lower wall portion 66.

As shown in FIG. 3, the reinforcement member 22 comprises an upper wall portion 72, a lower wall portion 74, a slanted wall portion 76, a front wall portion 78, upper side flanges 80 and 82, and lower side flanges 84 and 86. The upper wall portion 72 and the lower wall portion 74 oppose one another in the vehicle up and down direction. The vehicle up and down direction positions of the upper wall portion 72 and the lower wall portion 74 substantially coincide with those of the upper wall portion 30 and the lower wall portion 32 of the front side member 12.

The upper wall portion 72 and the lower wall portion 74 are each formed in a triangular shape as seen in a plan view. Vehicle front side edge portions 72A and 74A of the upper wall portion 72 and the lower wall portion 74 extend along the vehicle width direction, and vehicle width direction inside edge portions 72B and 74B of the upper wall portion 72 and the lower wall portion 74 extend along the vehicle front and rear direction. Furthermore, vehicle width direction outside edge portions 72C and 74C of the upper wall portion 72 and the lower wall portion 74 slant relative to the vehicle front and rear direction in such a way as to head inward in the vehicle width direction heading toward the vehicle rear side.

The slanted wall portion 76 extends in the vehicle up and down direction and couples the vehicle width direction outside edge portions 72C and 74C of the upper wall portion 72 and the lower wall portion 74 to one another. The slanted wall portion 76 slants relative to the vehicle front and rear direction in such a way as to head inward in the vehicle width direction heading toward the vehicle rear side. The front wall portion 78 is connected to the vehicle front side end portion of the slanted wall portion 76 and is bent inward in the vehicle width direction relative to the slanted wall portion 76. Additionally, the front wall portion 78 is disposed with its plate thickness direction coinciding with the vehicle front and rear direction (extends in the vehicle front and rear direction and the vehicle up and down direction). The vehicle front and rear direction position of a front surface 78A of the front wall portion 78 substantially coincides with that of the bonded surface between the rear end of the crash box 18 and the front end 12D1 of the front side member 12.

The upper flange 80 extends toward the vehicle upper side from the vehicle width direction inside edge portion 72B of the upper wall portion 72, and the lower side flange 84 extends toward the vehicle lower side from the vehicle width direction inside edge portion 74B of the lower wall portion 74. Furthermore, the upper side flange 82 extends toward the vehicle upper side from the vehicle front side edge portion 72A of the upper wall portion 72, and the lower side flange 86 extends toward the vehicle lower side from the vehicle front side edge portion 74A of the lower wall portion 74. The upper side flange 82 and the lower side flange 86 are bonded by welding to, in a state in which they have been overlaid from the vehicle rear side on, an upper end portion 88 and a lower end portion 90 of the front wall portion 78.

Furthermore, the upper side flange 80 is overlaid from the vehicle width direction outside on the upper end portion 40 of the side member outer panel 28 and is bonded by welding to the upper end portion 40 of the side member outer panel 28 and the upper side flange 36 of the side member inner panel 26 in a state in which the three have been overlaid on one another. Likewise, the lower side flange 84 is overlaid from the vehicle width direction outside on the lower end portion 42 of the side member outer panel 28 and is bonded by welding to the lower end portion 42 of the side member outer panel 28 and the lower side flange 38 of the side member inner panel 26 in a state in which the three have been overlaid on one another. Additionally, because of this, the reinforcement member 22 is bonded to the vehicle width direction outside side wall portion (the front end portion of the side member outer panel 28) of the front end portion 12D of the front side member 12 (the front portion 12A).

The reinforcement member 22 is positioned on the vehicle front side of the stabilizer bracket 20 and comprises a space disposed between it and the stabilizer bracket 20. Furthermore, the reinforcement member 22 projects outward in the vehicle width direction relative to the front end portion 12D. Additionally, because the reinforcement member 22 is bonded to the front end portion 12D (the section on the front end 12D1 side) of the front side member 12, the reinforcement member 22 makes the vehicle front and rear direction yield strength of the front side member 12 higher at the front end portion 12D than at the section between the front side attachment portion 48 and the rear side attachment portion 50.

In other words, in a case where the region of the front side member 12 where the reinforcement member 22 is disposed is a first region A1, the region of the front side member 12 where the stabilizer bracket 20 is disposed is a second region A2, and the region of the front side member 12 between the front side attachment portion 48 and the rear side attachment portion 50 is a third region A3, the vehicle front and rear direction yield strength is higher in the first region A1 than in the third region A3. Furthermore, the vehicle front and rear direction yield strength is higher in the second region A2 than in the first region A1.

Assuming that the region between the second region A2 and the third region A3 is a fourth region A4, the vehicle front and rear direction yield strength is lower in the fourth region A4 than in the first region A1 and the second region A2, and the fourth region A4 comprises the same vehicle front and rear direction yield strength as the third region A3. Furthermore, the vehicle front and rear direction yield strength of the crash box 18 is set lower than that of the third region A3 and the fourth region A4.

Next, the action and effects of the present embodiment will be described.

As described in detail above, according to the vehicle body front portion structure 10 pertaining to the present embodiment, the reinforcement member 22 is bonded to the vehicle width direction outside side wall portion (the front end portion of the side member outer panel 28) of the front end portion 12D of the front side member 12. The reinforcement member 22 projects outward in the vehicle width direction relative to the front end portion 12D of the front side member 12. Consequently, during a small overlap crash, an overlap with the barrier (impactor) is ensured, so the crash load can be transmitted via the reinforcement member 22 to the front side member 12.

Furthermore, because the reinforcement member 22 is bonded to the front end portion 12D of the front side member 12 as described above, the reinforcement member 22 makes the vehicle front and rear direction yield strength of the front side member 12 higher at the front end portion 12D than at the section between the front side attachment portion 48 and the rear side attachment portion 50. Consequently, during a small overlap crash, the section of the front side member 12 between the front side attachment portion 48 and the rear side attachment portion 50 becomes deformed, so the suspension member 14 can be allowed to drop out from the front side attachment portion 48 as a result of the bolt 52 breaking, for example. Because of this, the suspension member 14 can be kept from becoming crushed and left, so an amount of deformation toward the vehicle rear side for the section of the front side member 12 between the front side attachment portion 48 and the rear side attachment portion 50 is ensured.

Figure 4:
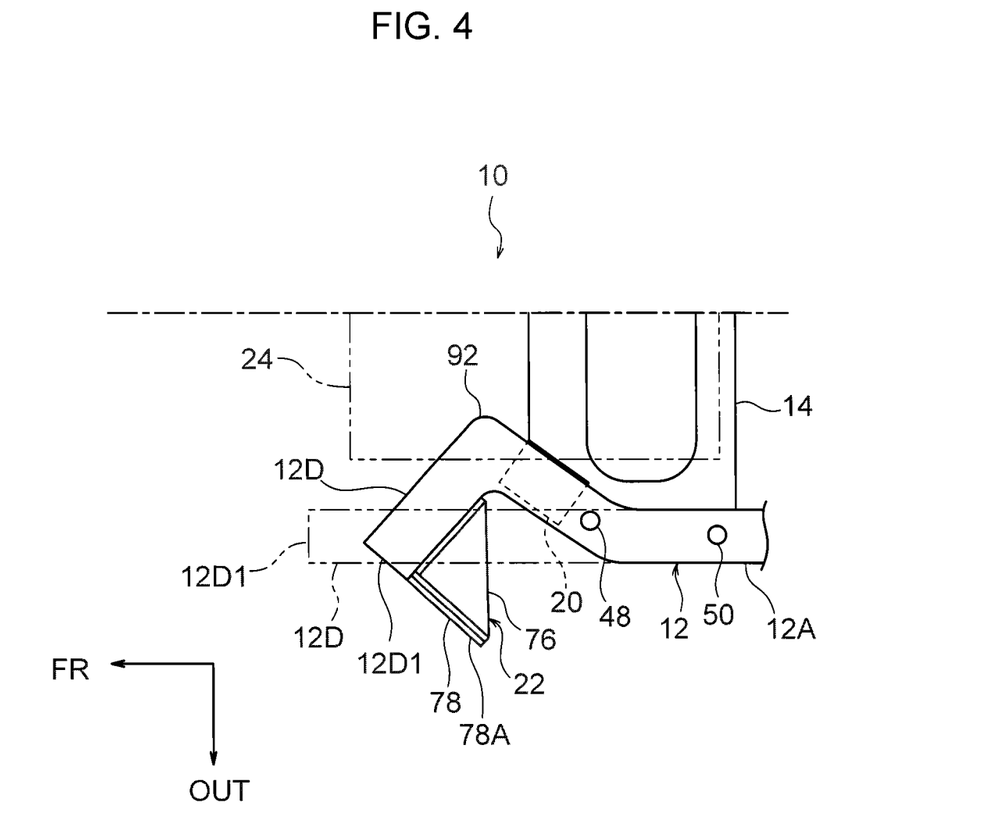
FIG. 4 is a plan view showing a state in which a vehicle to which the vehicle body front portion structure shown in FIG. 1 is applied has become involved in a small overlap crash.

Moreover, the stabilizer bracket 20 is secured to the section of the front side member 12 between the front end portion 12D and the front side attachment portion 48. Consequently, the stabilizer bracket 20 is shifted toward the vehicle rear side relative to the reinforcement member 22 bonded to the front end portion 12D of the front side member 12, so during a small overlap crash, as shown in FIG. 4, the front side member 12 becomes bent inward in the vehicle width direction between the reinforcement member 22 and the stabilizer bracket 20. Because of this, an amount of deformation toward the vehicle rear side for the section of the front side member 12 where the reinforcement member 22 and the stabilizer bracket 20 are disposed is ensured.

In this way, according to the vehicle body front portion structure 10, during a small overlap crash, an amount of deformation toward the vehicle rear side for the front side member 12 is ensured, so a deformation stroke toward the vehicle rear side for the front end 12D1 of the front side member 12 can be ensured. Because of this, energy absorption performance during a small overlap crash can be ensured.

Furthermore, during a frontal crash or an offset crash also, like during the small overlap crash described above, the section of the front side member 12 between the front side attachment portion 48 and the rear side attachment portion 50 and the section of the front side member 12 where the reinforcement member 22 and the stabilizer bracket 20 are disposed become deformed, so that an amount of deformation toward the vehicle rear side for the front side member 12 is ensured. Consequently, during a frontal crash or an offset crash also, a deformation stroke toward the vehicle rear side for the front end 12D1 of the front side member 12 can be ensured. Because of this, energy absorption performance during a frontal crash or an offset crash can also be ensured.

Moreover, the front side member 12 is disposed on the vehicle width direction outer side of the power unit 24 installed in the vehicle body front portion. Consequently, as described above, during a small overlap crash, in a case where the front side member 12 has become bent inward in the vehicle width direction between the reinforcement member 22 and the stabilizer bracket 20, a bent portion 92 of the front side member 12 interferes with the power unit 24. Because of this, a reaction force acts on the bent portion 92 from the power unit 24, so a lateral force can be produced with respect to the vehicle body during a small overlap crash.

Furthermore, the reinforcement member 22 comprises the front wall portion 78 that extends in the vehicle front and rear direction and the vehicle up and down direction. Consequently, during a small overlap crash, the crash load is efficiently input from the barrier to the front wall portion 78 of the reinforcement member 22, so the efficiency with which the load is transmitted from the barrier to the front side member 12 can be improved.

Furthermore, the slanted wall portion 76 that slants relative to the vehicle front and rear direction in such a way as to head inward in the vehicle width direction heading toward the vehicle rear side is formed between the vehicle width direction outside end portion of the front wall portion 78 and the vehicle width direction outside side wall portion (the front end portion of the side member outer panel 28) of the front end portion 12D of the front side member 12. Consequently, because of the crash load transmitted through the slanted wall portion 76, a component force inward in the vehicle width direction acts on the front side member 12 between the reinforcement member 22 and the stabilizer bracket 20, so the front side member 12 can be efficiently bent inward in the vehicle width direction.

Furthermore, according to the vehicle body front portion structure 10, the reinforcement member 22 is simply added to the front end portion 12D of the front side member 12, so the weight of the vehicle body can be reduced.

Next, example modifications of the present embodiment will be described.

Figure 5:
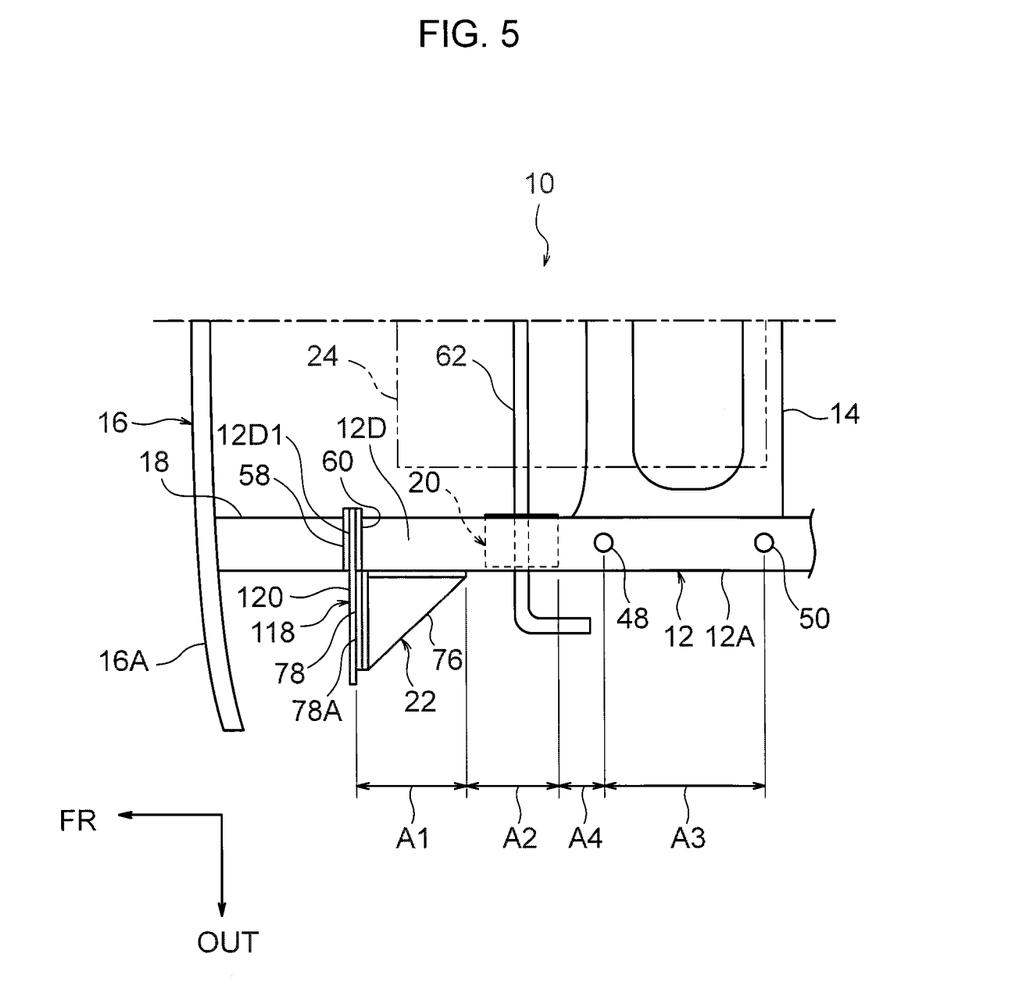
FIG. 5 is a plan view showing a first example modification of the vehicle body front portion structure pertaining to the embodiment of the present invention.

In the present embodiment, as shown in FIG. 5, a plate 118 may be interposed between the rear side flange 58 of the crash box 18 and the front side flange 60 of the front side member 12, an extension portion 120 that extends outward in the vehicle width direction may be formed on the plate 118, and the front wall portion 78 of the reinforcement member 22 may be bonded to the extension portion 120. When configured in this way, the rigidity of the attachment of the reinforcement member 22 to the front end portion 12D of the front side member 12 can be enhanced.

Figure 6:
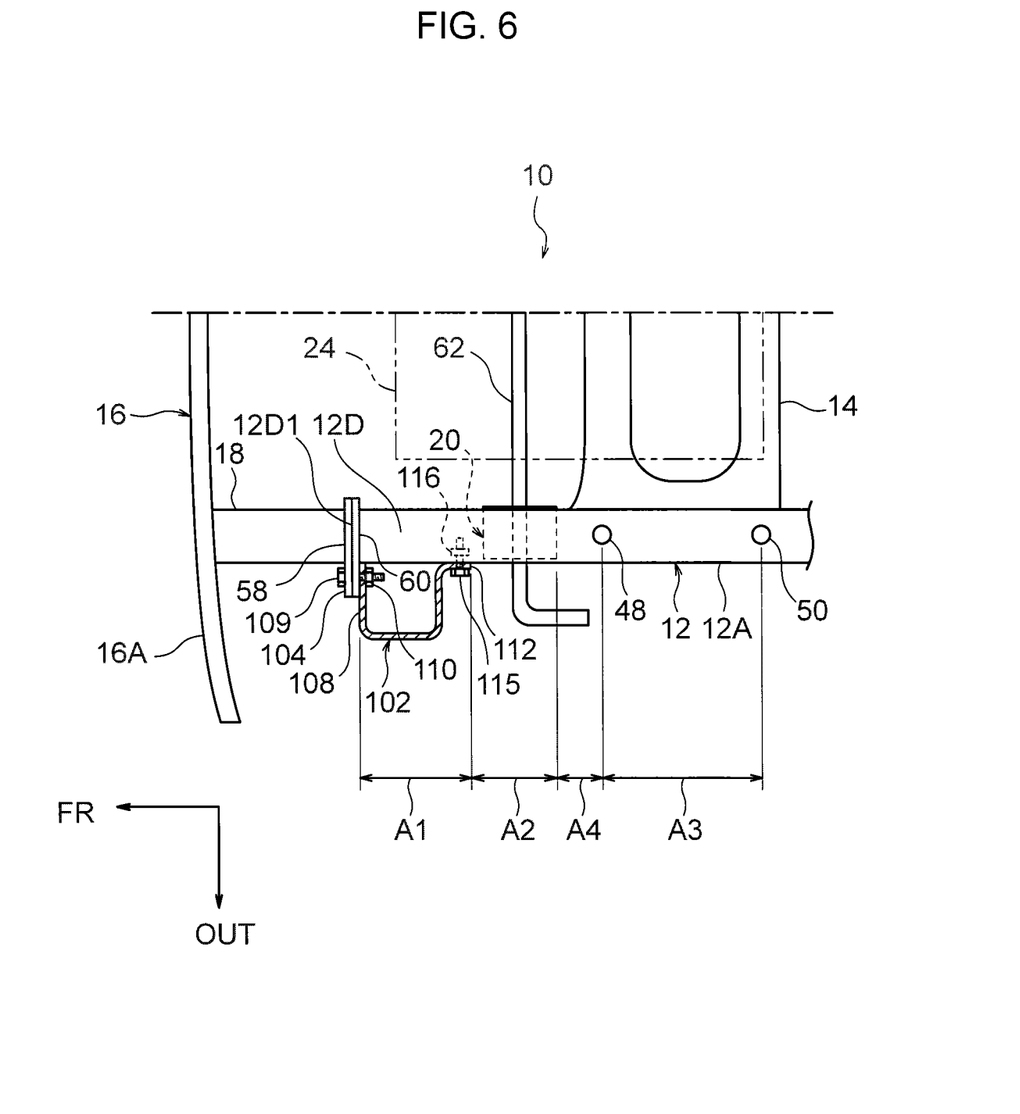
FIG. 6 is a plan view showing a second example modification of the vehicle body front portion structure pertaining to the embodiment of the present invention.

Furthermore, in the present embodiment, as described above, the dedicated reinforcement member 22 is used to reinforce the front end portion 12D of the front side member 12. However, for example, as shown in FIG. 6, an attachment member 102 for attachment a part installed inside the engine compartment may also be used as the reinforcement member. Additionally, because of this attachment member 102, the vehicle front and rear direction yield strength of the front side member 12 may be made higher at the front end portion 12D than at the section between the front side attachment portion 48 and the rear side attachment portion 50. Even when the attachment member 102 functioning as the reinforcement member is used, the same action and effects as described above are achieved.

It is preferred that a front wall portion 108 that extends in the vehicle front and rear direction and the vehicle up and down direction also be formed on the attachment member 102. When configured in this way, during a small overlap crash, the crash load is efficiently input from the barrier to the front wall portion 108, so the efficiency with which the load is transmitted from the barrier to the front side member 12 can be improved.

Furthermore, an extension portion 104 that extends in the vehicle width direction may be formed on the front side flange 60 formed on the front end 12D1 of the front side member 12, and the front wall portion 108 of the attachment member 102 may be bonded by a bolt 109 and a nut 110 to the extension portion 104. Furthermore, a flange 112 that extends toward the vehicle rear side may be formed on the rear end of the attachment member 102, and the flange 112 may be bonded by a bolt 115 and a nut 116 to the vehicle width direction outside side wall portion (the front end portion of the side member outer panel 28) of the front end portion 12D of the front side member 12. When configured in this way, the strength of the attachment of the attachment member 102 to the front side member 12 can be ensured.

An embodiment of the present invention has been described above, but the present invention is not limited to what has been described above and, in addition to what has been described above, of course can be modified and implemented in a variety of ways without departing from the spirit thereof.

The invention claimed is:

1. A vehicle body front portion structure comprising:
a front side member that extends in a vehicle front and rear direction;
a suspension member that is coupled to a front side attachment portion and a rear side attachment portion that are formed in a section of the front side member on a vehicle rear side of a front end portion of the front side member and are spaced apart from one another in the vehicle front and rear direction;
a stabilizer bracket that is secured to a section of the front side member between the front end portion and the front side attachment portion; and
a reinforcement member that is bonded to a vehicle width direction outside side wall portion of the front end portion, projects outward in a vehicle width direction relative to the front end portion, and makes a vehicle front and rear direction yield strength of the front side member higher at the front end portion than at a section between the front side attachment portion and the rear side attachment portion.

2. The vehicle body front portion structure according to claim 1, wherein the reinforcement member comprises:
a front wall portion that extends in the vehicle front and rear direction and the vehicle up and down direction; and
a slanted wall portion that slants relative to the vehicle front and rear direction in such a way as to head inward in the vehicle width direction heading toward the vehicle rear side and is formed between a vehicle width direction outside end portion of the front wall portion and the vehicle width direction outside side wall portion of the front end portion.

3. The vehicle body front portion structure according to claim 1, wherein the front side member is disposed on a vehicle width direction outer side of a power unit installed in the vehicle body front portion.

* * * * *